United States Patent [19]

Toda et al.

[11] Patent Number: 5,367,165
[45] Date of Patent: Nov. 22, 1994

[54] CANTILEVER CHIP FOR SCANNING PROBE MICROSCOPE

[75] Inventors: Akitoshi Toda; Katsuhiro Matsuyama, both of Tokyo, Japan

[73] Assignee: Olympus Optical Co., Ltd., Tokyo, Japan

[21] Appl. No.: 3,322

[22] Filed: Jan. 12, 1993

[30] Foreign Application Priority Data

Jan. 17, 1992 [JP] Japan .................. 4-006774
Jul. 30, 1992 [JP] Japan .................. 4-203757
Aug. 19, 1992 [JP] Japan .................. 4-219969

[51] Int. Cl.⁵ .............................. H01J 37/00
[52] U.S. Cl. .................... 250/306; 250/423 F
[58] Field of Search ............. 250/423 F, 306, 307

[56] References Cited

U.S. PATENT DOCUMENTS

| | | | |
|---|---|---|---|
| 4,724,318 | 2/1988 | Binnig | 250/306 |
| 4,916,002 | 4/1990 | Carver | 428/139 |
| 4,943,719 | 7/1990 | Akamine et al. | 250/306 |
| 5,021,364 | 6/1991 | Akamine et al. | 250/306 |
| 5,066,358 | 11/1991 | Quate et al. | 250/306 |
| 5,245,187 | 9/1993 | Kawase et al. | 250/306 |
| 5,264,696 | 11/1993 | Toda | 250/306 |

OTHER PUBLICATIONS

Atomic Resolution Imaging of A Nonconductor by Atomic Force Microscopy; J. Appl. Phys. 62(7), Oct. 1, 1987; pp. 2599–2602; Albrecht et al.
Microfabrication of Cantilever Sytli for The Atomic Force Microscope; J. Vac. Sci. Technol. A 8(4); Jul.-/Aug. 1990; pp. 3386–3396; Albrecht et al.

*Primary Examiner*—Bruce C. Anderson
*Attorney, Agent, or Firm*—Frishauf, Holtz, Goodman & Woodward

[57] ABSTRACT

A cantilever chip has a holding substrate, and a cantilever having the shape of a hollow triangle extends from the holding substrate. A probe is arranged at the distal end portion of the cantilever. An axis of the probe is inclined at a predetermined angle with respect to a normal extending from the surface of the cantilever. This angle is set such that the axis of the probe is perpendicular to a sample surface when the cantilever chip is mounted on an atomic force microscope.

9 Claims, 16 Drawing Sheets

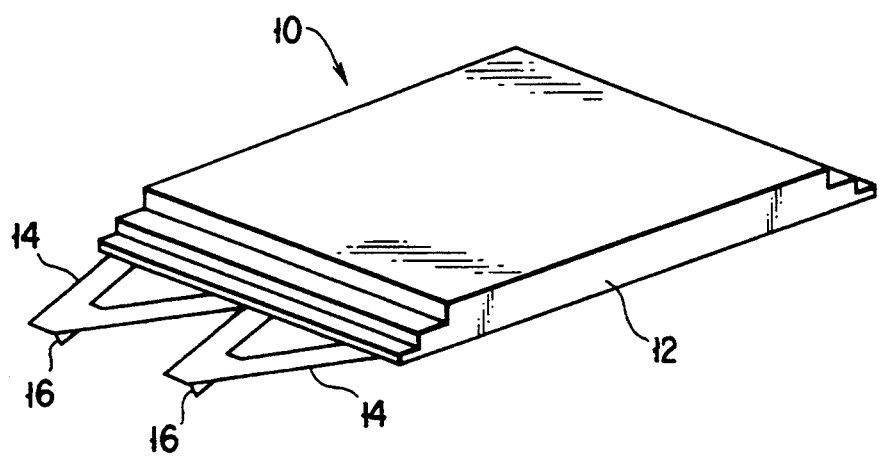
F I G. 1A
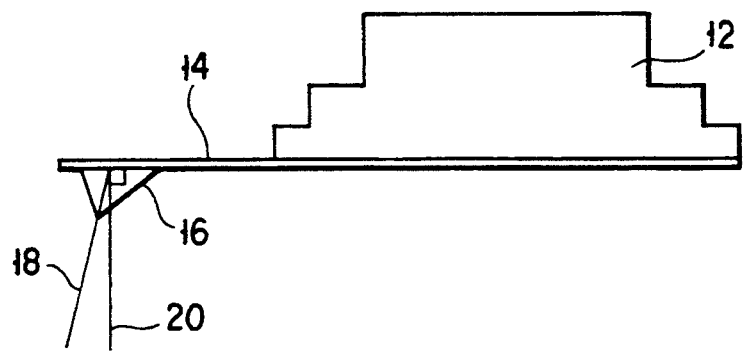
F I G. 1B
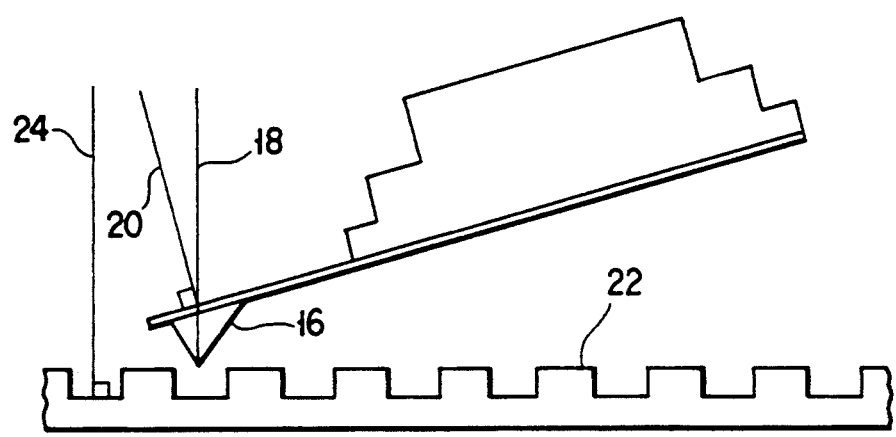
F I G. 2

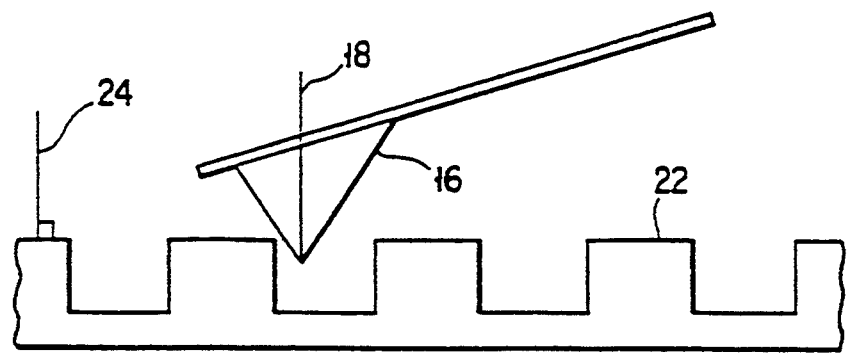
F I G. 3A
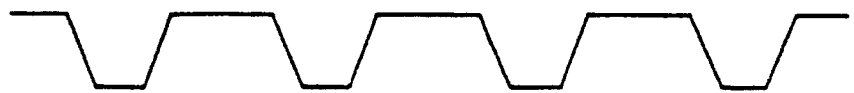
F I G. 3B
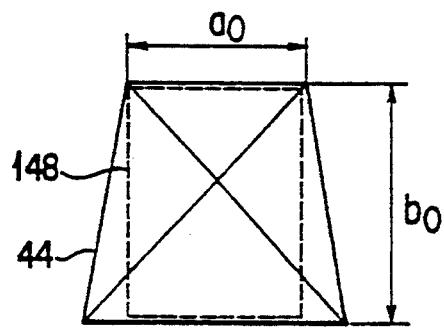
F I G. 5

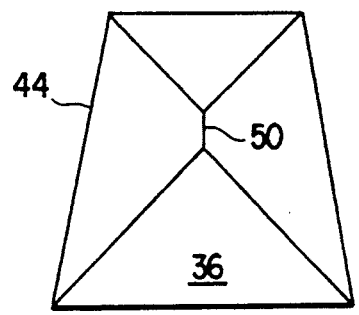
F I G. 8A
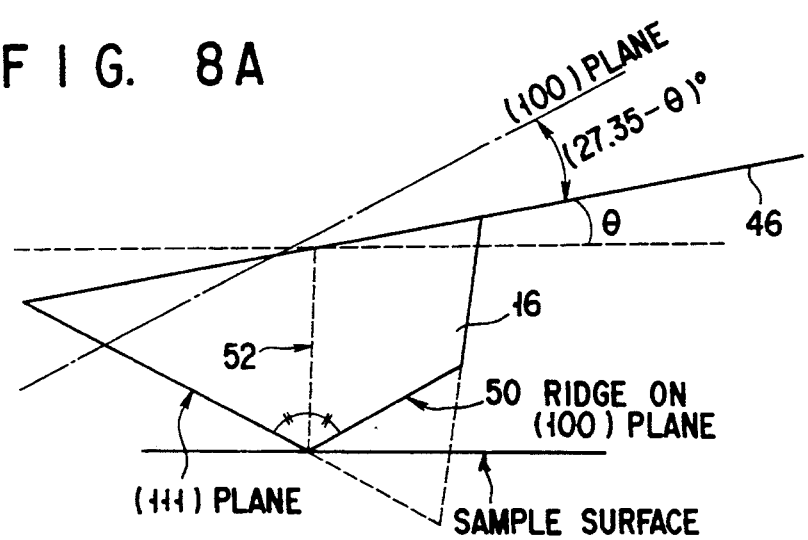
F I G. 8B
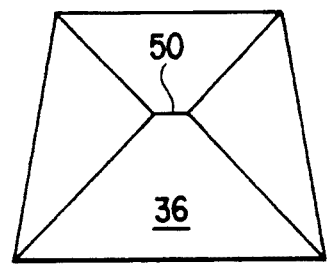
F I G. 8C
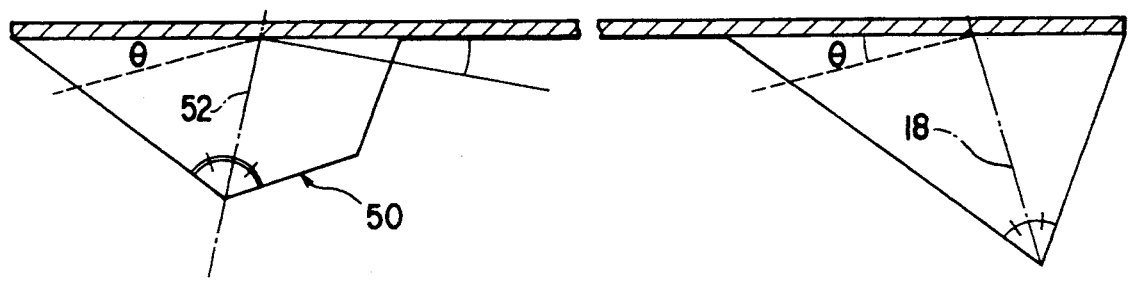
F I G. 9

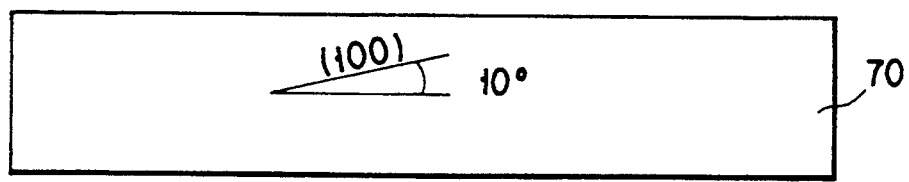
F I G. 11A
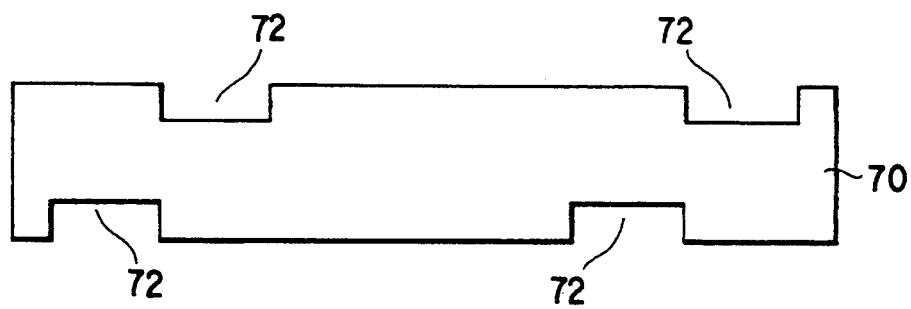
F I G. 11B
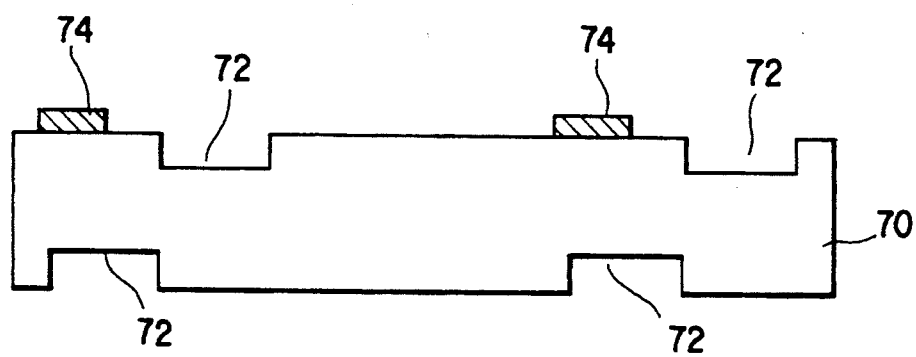
F I G. 11C
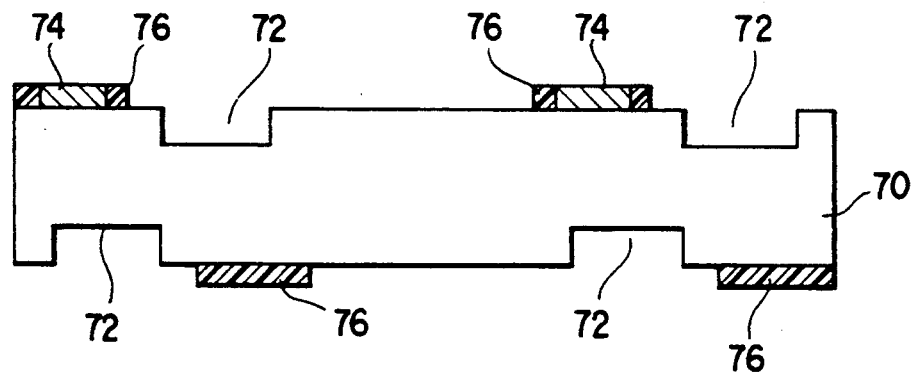
F I G. 11D

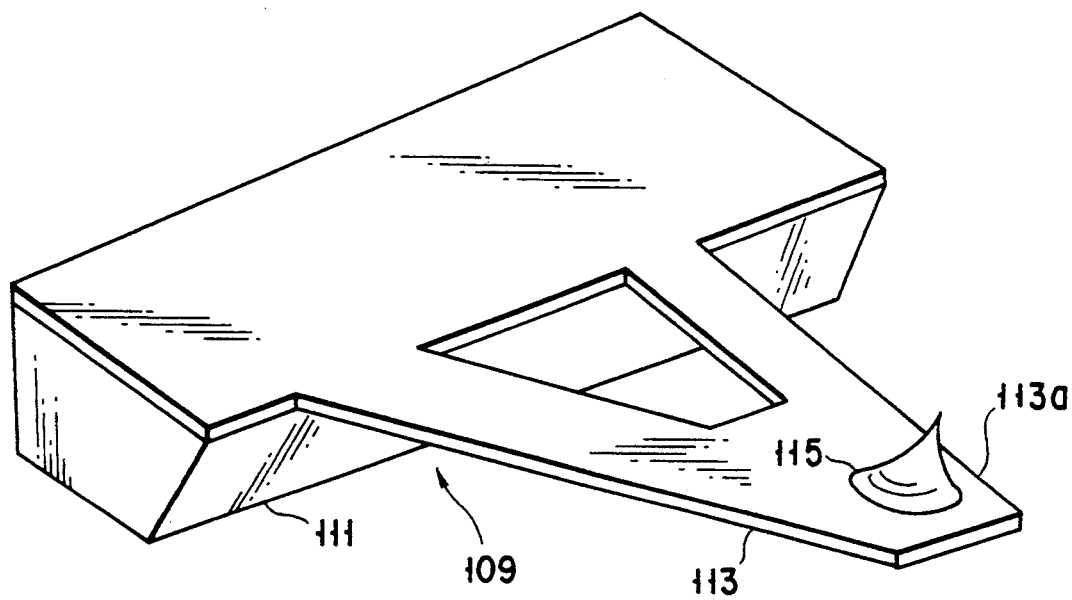
F I G. 16A
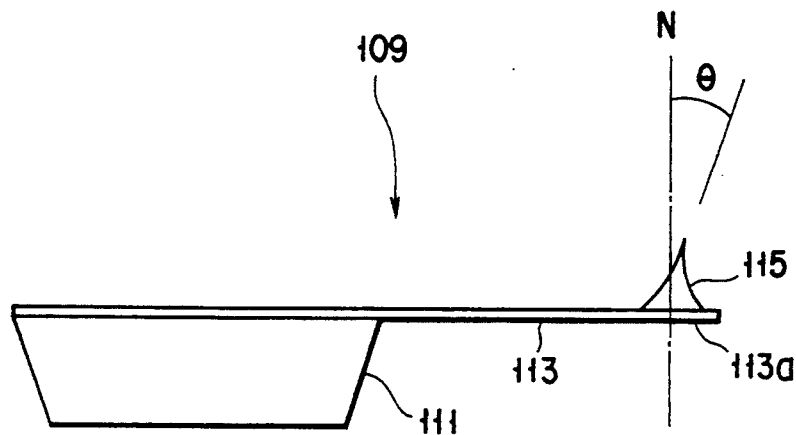
F I G. 16B

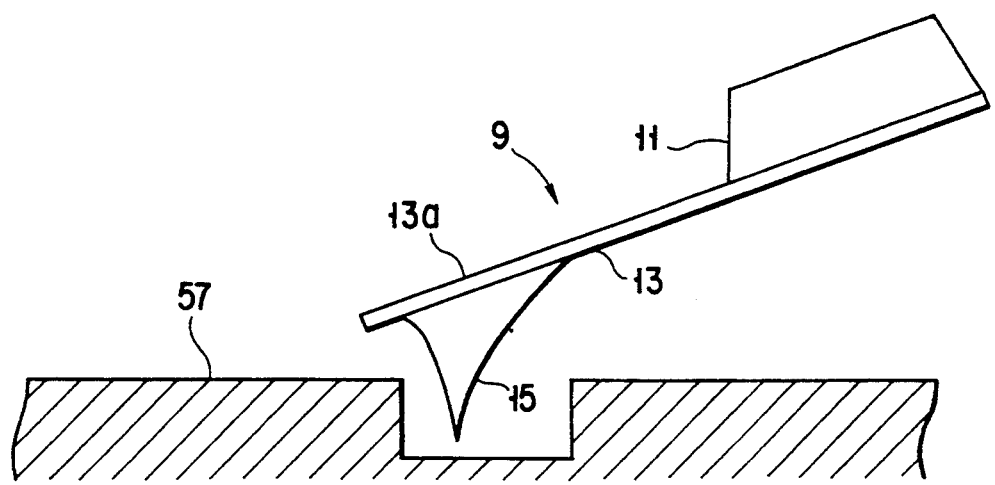
FIG. 18A
FIG. 18B
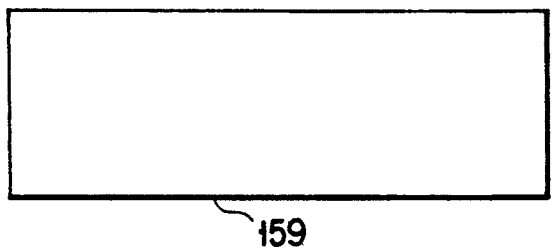
FIG. 19A
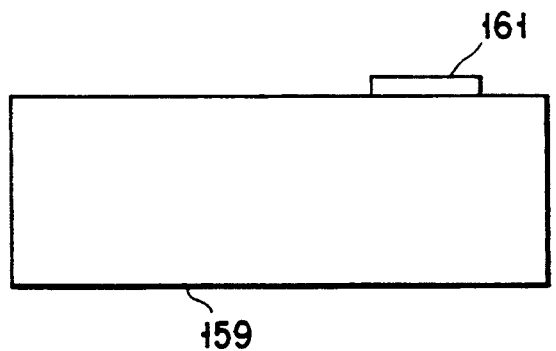
FIG. 19B
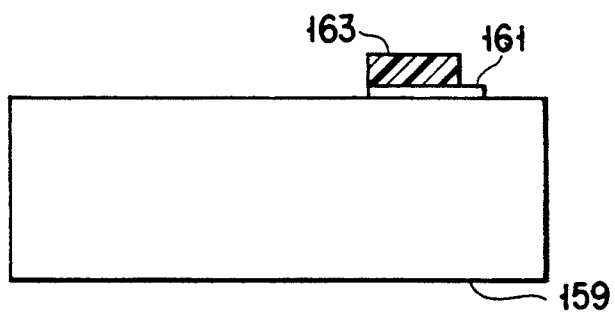
FIG. 19C

CANTILEVER CHIP FOR SCANNING PROBE MICROSCOPE

BACKGROUND OF THE INVENTION

1. Field of the Invention

The present invention relates to a cantilever chip for a scanning probe microscope.

2. Description of the Related Art

By using element techniques such as a servo technique in a scanning tunneling microscope (STM) devised by Binnig and Rohrer et al., a microscope allows observation of an insulating sample, which is not easily measured by the STM, at accuracy of an atomic order. As this microscope, an atomic force microscope (AFM) is proposed and practically used.

The AFM is similar to the STM in structure, and the AFM is classified as one of the scanning probe microscopes. In the AFM, a cantilever having a sharp projection portion (probe portion) at its free end is brought close to a sample, the motion of the cantilever which is displaced by interaction acting between atoms of the distal end of the probe and atoms of the sample surface is electrically or optically measured while the probe portion relatively moves along the sample surface, and data of the respective points of the sample surface are time-serially detected and processed, thereby obtaining three-dimensional data such as unevenness data of the sample.

Conventionally, as a cantilever for a scanning probe microscope, an $SiO_2$ cantilever chip formed by applying a semiconductor IC process is proposed in "Thomas R. Albrecht and Calvin F. Quate, "Atomic resolution Imaging of a nonconductor by Atomic force Microscopy" J. Appl. Pys, 62(1987)2599". Since this proposal, cantilevers are easily formed at high accuracy in a micron order with good reproducibility, and are manufactured at low cost by using a batch process. For this reason, cantilevers formed by applying the semiconductor IC manufacturing process are popularly used.

For example, a cantilever chip which is described in "J. Vac. Sci. Technol. A8(4)3386 1990 (T. Albrecht, S. Akamine, T. E. Caver and C. F. Quate)" and in which, in place of an $SiO_2$ film, a silicon nitride film is used as a cantilever constituent material has been commercially available. This cantilever has a length of about 50 to 200 μm, a thickness of about 0.5 to 1 μm, and a shape of a hollow triangle or rectangle.

When the cantilever chip is to be mounted on an AFM apparatus, the cantilever chip is inclined on the apparatus at an angle of about 15° with respect to the sample such that the support portion of the cantilever is not brought into contact with a target sample. In a cantilever manufactured in a normal batch process, the axis of the probe at the distal end of the cantilever is perpendicular to the surface of the cantilever. For this reason, the axis of the probe is not parallel to a normal extending from the surface of the target sample, and the probe opposes the normal while the probe is inclined. In this state, when AFM measurement is performed, and the sample has a step portion, the side surface of the probe may collide against the upper end of the step portion on one of the rising and falling sides of the step portion before the distal end of the probe reaches the lower end of the step portion. For this reason, when a grating sample having a large number of rectangular grooves crossing the scanning direction of the probe is measured, although both sides of each of the grooves have the same shape, measurement results, i.e., traces of the distal end of the probe are different from each other, and an image which does not accurately represent the surface shape of the sample is obtained.

In addition, the resolving powers of a scanning probe microscope in the horizontal and vertical directions depend on a degree of sharpness of the probe. For this reason, a probe having a sharp distal end is desirably used.

SUMMARY OF THE INVENTION

It is one object of the present invention to provide a cantilever chip, for a scanning probe microscope, which is mounted on an apparatus to be inclined with respect to the surface of a sample and which can obtain an image accurately representing the surface data of the sample by using the cantilever chip.

It is another object of the present invention to provide a cantilever chip having such a sharp probe as enables the production of an image accurately reflecting the surface data of a sample.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a perspective view showing a cantilever chip according to the first embodiment of the present invention;

FIG. 1B is a cross-sectional view showing the cantilever chip in FIG. 1A;

FIG. 2 shows a state wherein the cantilever chip shown in FIGS. 1A and 1B is mounted on an AFM apparatus;

FIG. 3A is an enlarged view showing the probe in FIG. 2 and a peripheral portion thereof, and a positional relationship between the probe and a sample;

FIG. 3B shows data of the height of the sample shown in FIG. 3A and obtained by measurement;

FIG. 5 shows the shape of an opening formed in a silicon nitride film in the step in FIG. 4B;

FIGS. 8A to 8C show holes formed in a silicon wafer and each having a shape having a straight portion at its bottom;

FIG. 9 shows probes having different shapes and respectively formed on cantilevers arranged on both sides;

FIGS. 11A to 11L are views for explaining the steps in manufacturing the cantilever shown in FIGS. 10A and 10B;

FIG. 16A is a perspective view showing a cantilever chip according to the forth embodiment of the present invention;

FIG. 16B is a cross-sectional view showing the cantilever chip in FIG. 16A;

FIG. 18A shows a state wherein a sample surface is measured by the cantilever chip shown in FIGS. 16A and 16B;

FIG. 18B shows data of the height of the sample shown in FIG. 18A and obtained by measurement;

FIGS. 19A to 19C are views for explaining the steps in forming another mask used for forming the probe shown in FIGS. 16A and 16B.

DETAILED DESCRIPTION OF THE PREFERRED EMBODIMENTS

Figure 4A:
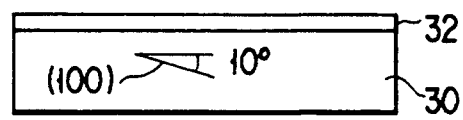
FIGS. 4A to 4H are views for explaining the steps in manufacturing the cantilever chip shown in FIGS. 1A and 1B.

Embodiments of cantilever chips for a scanning probe microscope according to the present invention will be described below with reference to the accompanying drawings.

A cantilever chip 10 of the first embodiment, as shown in FIG. 1A, has a support portion, i.e., a holding substrate 12, and cantilevers 14 each having the shape of a hollow triangle extend from the holding substrate 12. A probe 16 is arranged at the distal end portion of each of the cantilevers 14. An axis 18 of the probe 16, as shown in FIG. 1B, has a predetermined angle $\theta(0° < \theta \leq 90°)$ with respect to a normal 20 extending from the surfaces of the cantilevers 14. This angle is set such that the axis 18 of the probe 16 is perpendicular to a sample surface when the cantilever chip 10 is mounted on an AFM. The cantilever chip 10, as shown in FIG. 2, is mounted on an AFM (not shown) such that the axis 18 of the probe 16 is parallel to a normal 24 extending from the surface of a sample 22.

The probe 16 generally scans a sample in the longitudinal direction of the cantilever 14, i.e., in the left-and-right direction in FIG. 2. (Where, as shown in FIG. 1A, the cantilever is shaped like an isosceles triangle, its longitudinal direction is a direction in which the bisector passing through the vertical angle extends.) Therefore, the probe 16 preferably has at least a symmetrical shape when viewed from the longitudinal direction of the cantilever 14. In addition, the probe 16 more preferably has a symmetrical shape when viewed from the direction perpendicular to the longitudinal direction. For this reason, the probe 16 preferably has the shape of a pyramid or a cone.

Since the probe 16 has symmetry about the axis 18 inclined with respect to the normal extending from the surface of the cantilever 14 when viewed from the longitudinal direction of the cantilever and the direction perpendicular to the longitudinal direction, data obtained upon measuring the grating sample 22 shown in FIG. 3A has more preferable symmetry, i.e., both identical side surfaces in a groove, as shown in FIG. 3B.

In recent years, a scanning direction is set in a direction rotated through an angle of 90°, i.e., a direction perpendicular to the drawing surface in FIG. 3A, and measurement of a friction force is tried. Since the above probe having a pyramid or conical shape has symmetry when viewed from the longitudinal direction of the cantilever and the direction perpendicular to the longitudinal direction, even if the scanning direction is rotated through an angle of 90°, preferable data can be obtained.

A method of manufacturing the cantilever chip 10 will be described below with reference to FIGS. 4A to 4H.

As shown in FIG. 4A, a silicon nitride film 32 is formed by CVD on a silicon wafer 30 having the (100) plane inclined at an angle of 10° with respect to the surface of the silicon wafer 30.

Figure 4B:
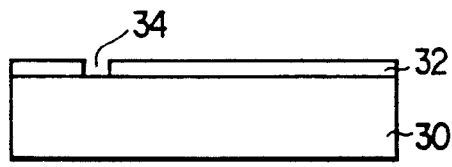

As shown in FIG. 4B, the silicon nitride film 32 is patterned by photolithography to form an opening 34 at a portion where a probe is to be formed.

Figure 4C:
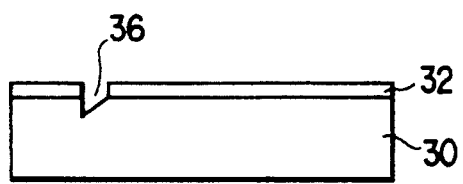

As shown in FIG. 4C, wet anisotropic etching is performed to the silicon wafer 30 using the silicon nitride film 32 as a mask to form a hole 36 having the shape of an inverted quadrangular pyramid and using the opening 34 as a bottom surface. The axis of the quadrangular pyramid of the hole formed as described above is inclined at an angle of 10° with respect to the surface of the wafer.

Figure 4D:
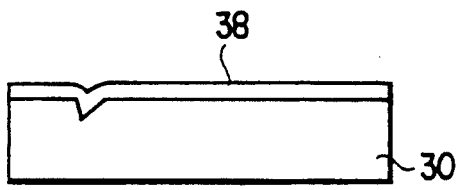

After the silicon nitride film 32 is removed, as shown in FIG. 4D, a silicon nitride film 38 having a thickness of about 0.4 to 1 μm is formed on the silicon wafer 30 by CVD.

Figure 4E:
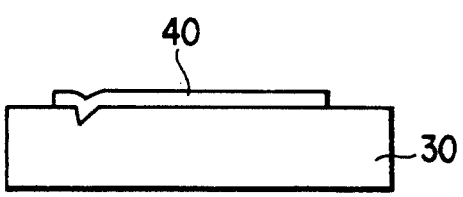

As shown in FIG. 4E, the silicon nitride film 38 is patterned into a predetermined shape to form a cantilever 40.

Figure 4F:
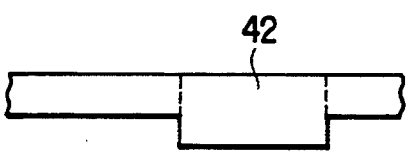

As shown in FIG. 4F, pyrex glass 42 serving as a holding substrate is processed in accordance with a cantilever shape pattern on the silicon wafer.

Figure 4G:
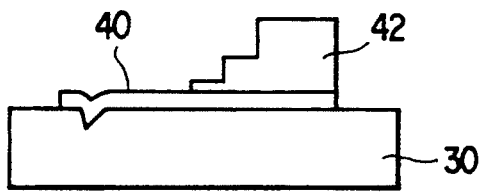

As shown in FIG. 4G, the pyrex glass 42 and the cantilever 40 are combined with each other by anodization bonding.

Figure 4H:
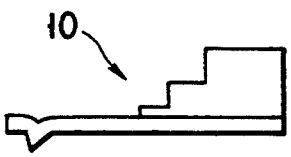

As shown in FIG. 4H, the silicon wafer 30 is removed by etching using a 40% aqueous KOH solution to obtain the cantilever chip 10 shown in FIGS. 1A and 1B.

In the above process, the probe 16 is formed to have the shape of the hole having the shape of an inverted quadrangular pyramid. The shape of the probe 16, i.e., the shape of the hole 36 having the shape of an inverted quadrangular pyramid can be properly changed by changing the shape of the opening 34 formed in the silicon nitride film 32. The hole 36 having the shape of an inverted quadrangular pyramid is formed by exposing the (111) surface of the silicon wafer 30. Therefore, the hole 36 has the four (111) planes crossing each other on a point or a straight line.

Figure 6:
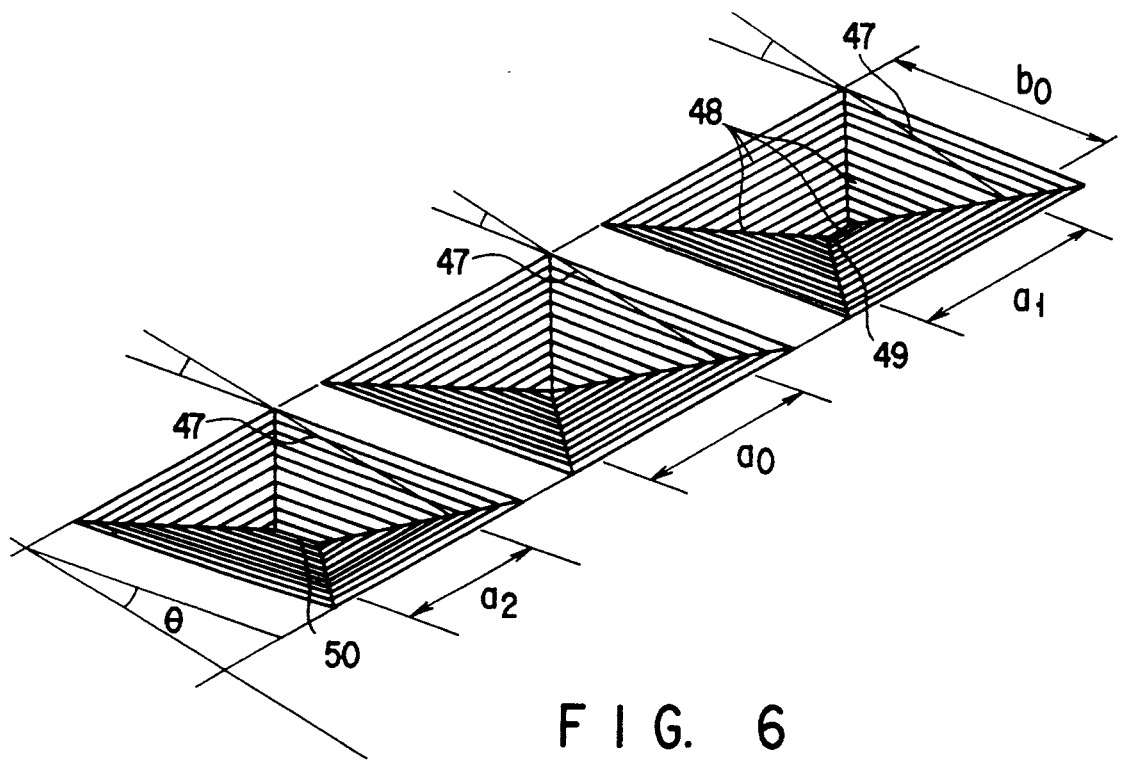
FIG. 6 shows holes having different shapes and formed in accordance with the short sides and the heights of trapezoidal openings.

That is, when wet anisotropic etching is performed on the silicon wafer (inclination angle is set to be $\theta$) having the inclined (111) plane using the opening of a trapezoidal pattern shown in FIG. 5, quadrangular-pyramid etching is performed in the opening defined by a short side a and a height b of the trapezoid, and the silicon wafer is etched like an atomic step on the basis of the comparison result of the short side a and the height b such that the (100) surface is peeled as shown in FIG. 6. In fact, when the etching is started from a trapezoid 47 on the wafer surface, it is assumed that (111) planes 48 cross each other at one point when the short side and the height are represented by $a_0$ and $b_0$. At this time, a ridge 49 is formed in a direction perpendicular to the inclined surface of the original wafer surface when $a_1 > a_0$ is satisfied, and a ridge 50 is formed in a direction parallel to the inclined surface when $a_2 < a_0$ is satisfied.

Figure 7A:
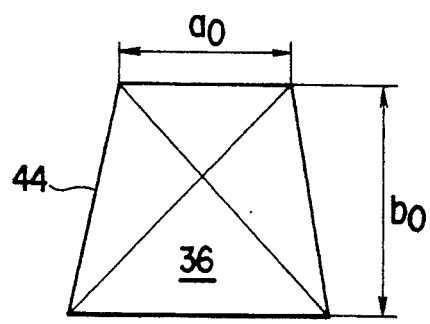
FIGS. 7A and 7B show holes each having the shape of an inverted quadrangular pyramid and formed in a silicon wafer.
Figure 7B:
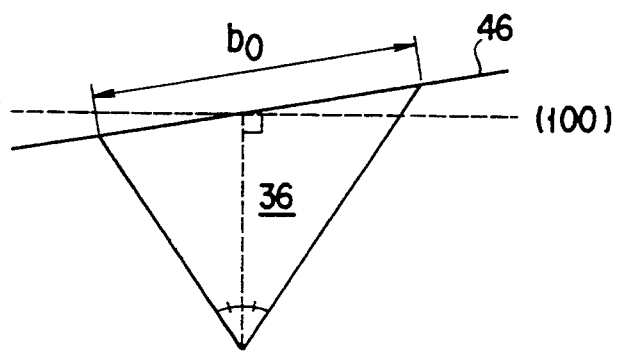

The hole 36 having the shape of an inverted quadrangular pyramid and formed in the silicon wafer 30 when the hole 36 has one vertex is shown in FIGS. 7A and 7B. An opening 44 formed in a surface 46 of the silicon wafer 30 has the shape of a trapezoid, and is used as a bottom surface of the inverted quadrangular pyramid for forming the probe 16. Since wet anisotropic etching causes exposure of the (111) surface of the silicon wafer 30, the opening 34 formed in the silicon nitride film 32 to form the hole 36 having the above shape must actually form a rectangle 148 indicated by a broken line in FIG. 5. That is, as shown in FIG. 7A, when the length Of the upper side and the height of the trapezoidal opening 44 formed in the surface 46 of the silicon wafer 30 are represented by $a_0$ and $b_0$, respectively, only the opening 34 having the rectangle 48 having a horizontal length $a_0$ and a vertical length $b_0$ is required to be formed.

Probes having other shapes will be described below with reference to FIGS. 8A to 8C. The vertical and horizontal dimensions of the opening 34 formed in the silicon nitride film 32 are changed. If $a_2 < a_0$ is satisfied, since the hole 36 having the shape of an inverted quadrangular pyramid and formed in the silicon wafer 30 has the four (111) planes crossing each other on a straight line as shown in FIG. 8A, the hole 36 has a shape having the ridge 50. In this case, the probe 16 formed on the basis of the hole 36 has the ridge 50 extending along the cantilever 14 (FIG. 8B). The axis of the probe 16 formed as described above is represented by reference numeral 52 in FIG. 8B. When $a_1 > a_0$ is satisfied, as shown in FIG. 8C, the hole has a shape having the ridge 50 in a direction perpendicular to the longitudinal direction of the cantilever 14.

The cantilever chip 10 may have another cantilever on the side opposite to the cantilever 14. At this time, as shown in FIG. 9, probes having different shapes can be arranged on both of the cantilevers, respectively.

The distal end portion of the probe shown in FIG. 2 or the like has the shape of a quadrangular pyramid, as indicated by reference numeral 25 in FIG. 2. The distal end portion of the probe shown in FIGS. 8A and 8B, as indicated by reference numeral 26 in FIG. 20, has the shape of a triangular pyramid.

Figure 20:
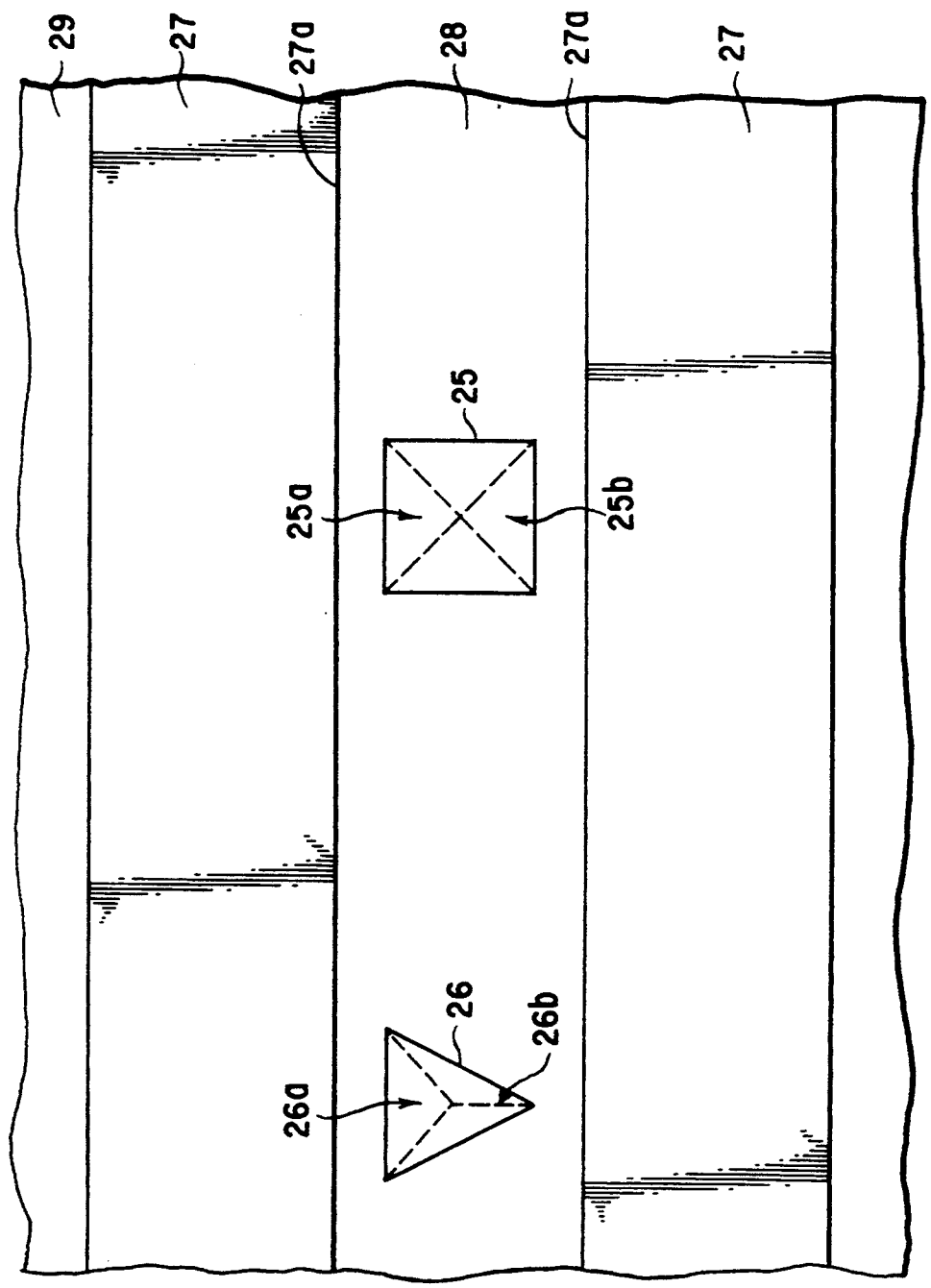
FIG. 20 is a plan view showing only probes arranged above a sample and shown in FIGS. 3A, 8A, and 8B when viewed from the top.

FIG. 20 is a view showing only the distal end portions of both the probes when viewed from the top. Therefore, FIG. 20 shows the section obtained by cutting the probes along the plane perpendicular to the central axis. A grating sample 29 having a projection portion 27 and a recessed portion 28 as shown in FIG. 3A is arranged under the probes. Note that reference numeral 27a denotes the edge of the projection portion 27, reference numerals 25a and 25b denote side surfaces of the probe 25, reference numeral 26a denotes a side surface of the probe 26, and reference numeral 26b denotes a ridge of the side portion of the probe 26.

A case wherein both the probes positioned at the recessed portion 28 scan the sample in directions A and B will be considered.

When a probe such as the probe 26 having a distal end portion having the shape of a triangular pyramid is used, and the probe scans the sample in the direction A in FIG. 20, a force caused by interaction of the edge 27a and the surface 26a acts on the probe. On the other hand, when the probe scans the sample in the direction B in FIG. 20, a force caused by interaction of the edge 27a and the ridge 26b acts on the probe. Therefore, the difference between "edge and surface" and "edge and ridge" may influence the symmetry of obtained data.

However, when a probe such as the probe 25 having a distal end portion having the shape of a quadrangular pyramid is used, and the probe scans the sample in the directions A and B in FIG. 20, since a force in the sample surface direction caused by interaction of the edge 27a and the surface 25a or 25b acts on the probe, data which does not depend on the scanning directions is obtained.

In the probe (the projection shape viewed from a direction perpendicular to the longitudinal direction of a cantilever is formed to have symmetry in the longitudinal direction of the cantilever), the sectional shape (e.g., the upper surface of the probe 25) obtained by cutting the distal end portion of the probe along a plane perpendicular to the central axis of the probe is preferably formed to also have symmetry with respect to the longitudinal direction of the cantilever (scanning direction).

Figure 10A:
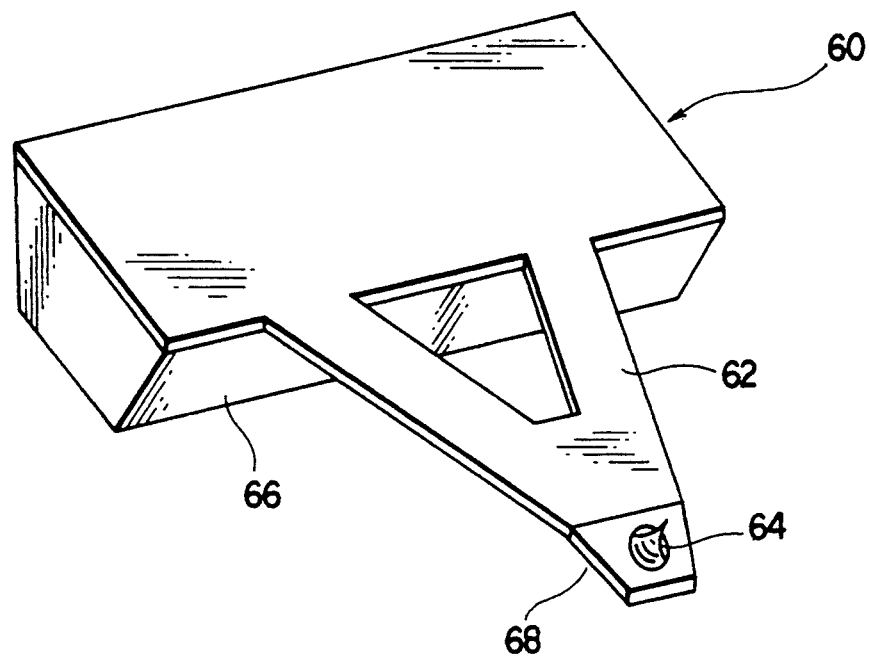
FIG. 10A is a perspective view showing a cantilever chip according to the second embodiment of the present invention.
Figure 10B:
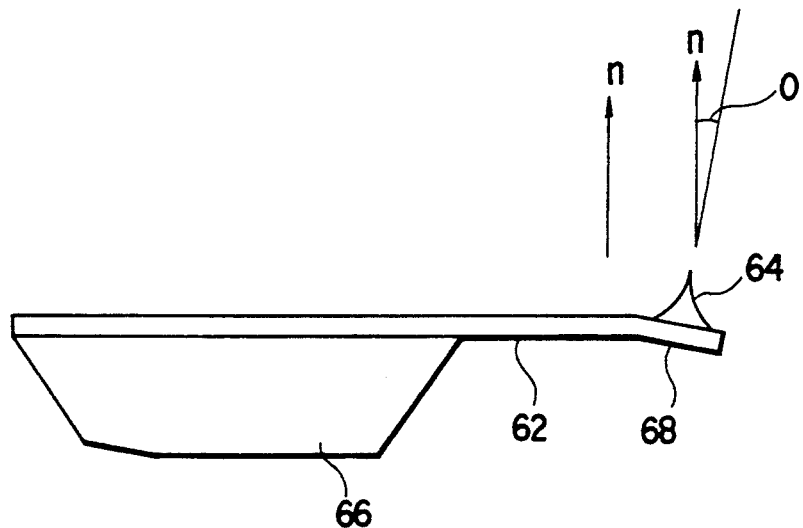
FIG. 10B is a cross-sectional view showing the cantilever chip in FIG. 10A.

A cantilever chip according to the second embodiment of the present invention will be described below with reference to FIGS. 10A and 10B. A cantilever chip 60 of this embodiment, as shown in FIG. 10A, has a holding substrate 66, and a cantilever 62 having the shape of a hollow triangle extends from the cantilever chip 60. A probe 64 having a conical shape is formed at a distal end portion 68. The distal end portion 68, as shown in FIG. 10B, is inclined at an angle $\theta$ with respect to the cantilever 62. As a result, the axis of the probe 64 is inclined by the angle $\theta$ with respect to a normal vector n extending from the surface of the cantilever 62. Therefore, an aspect ratio can be substantially increased, and a step-like uneven surface can be accurately expressed.

A method of manufacturing the cantilever chip of this embodiment will be described below with reference to FIGS. 11A to 11L.

A silicon wafer 70 having a plane direction inclined at an angle of 10° with respect to the (100) plane is prepared (FIG. 11A). Grooves 72 are formed in the upper and lower surfaces of the silicon wafer 70 by photolithography so as to correspond to the interval of cantilever chips (FIG. 11B). A silicon nitride film having a thickness of 400 nm is deposited on the surface of the silicon wafer 70, and is patterned to form circular probe masks 74 (FIG. 11C). Thereafter, belt-like silicon oxide films 76 along the grooves 72 are formed on the upper and lower surfaces of the silicon wafer 70 (FIG. 11D).

Figure 12:
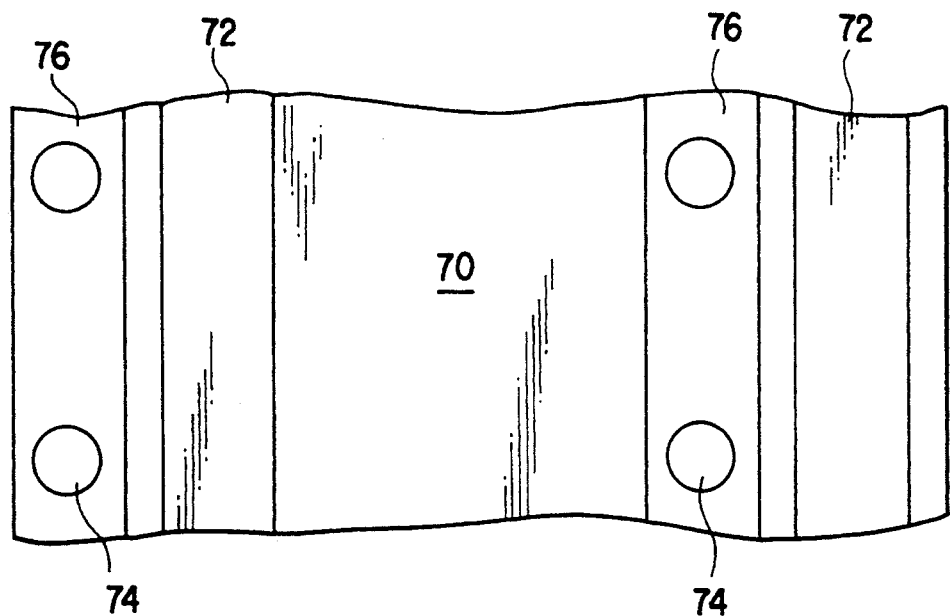
FIG. 12 is a plan view showing a wafer obtained when the step in FIG. 11D is finished.

FIG. 12 is a plan view showing the wafer on which the belt-like silicon films 76 are formed.

Figure 11E:
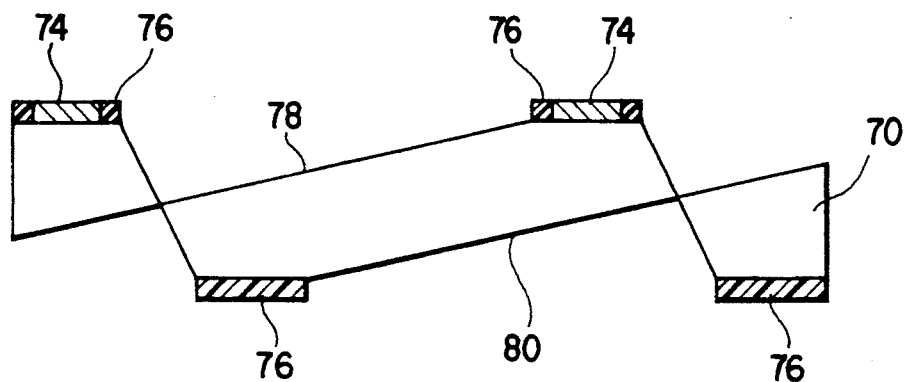
Figure 11F:
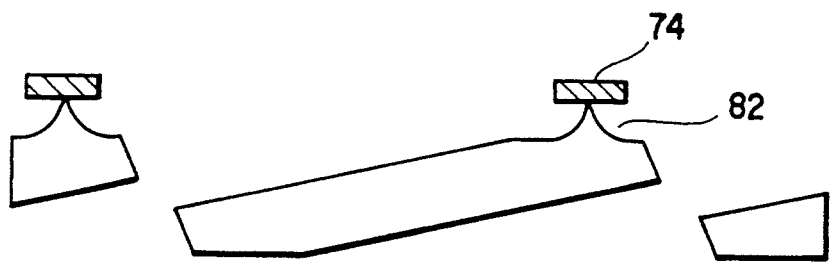
Figure 11G:
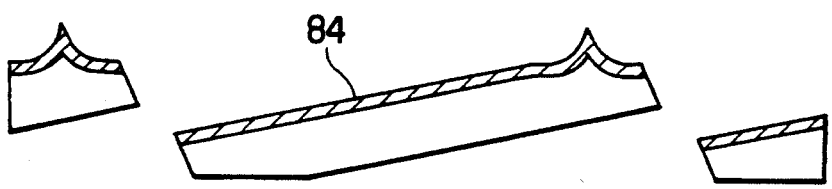
Figure 11H:
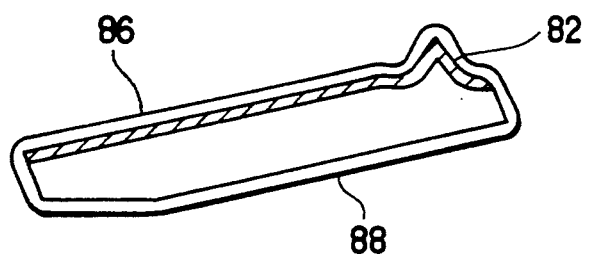

The silicon wafer 70 is anisotropically etched by an aqueous potassium hydroxide solution to expose two (100) surfaces 78 and 80 on the upper and lower surfaces of the silicon wafer 70 (FIG. 11E). Subsequently, after the silicon oxide films 76 are removed by hydrofluoric acid processing, a probe 82 is formed by reactive ion etching (dry etching) (FIG. 11F). After the probe masks 74 are removed, boron is implanted in the silicon wafer 70 from its upper surface to form a p-type silicon layer 84 (FIG. 11G). Thereafter, silicon oxide films 86 and 88 are formed on the upper and lower surfaces of the wafer by low-temperature oxidation (950° C. in a thermal oxidation furnace), respectively (FIG. 11H).

Figure 11I:
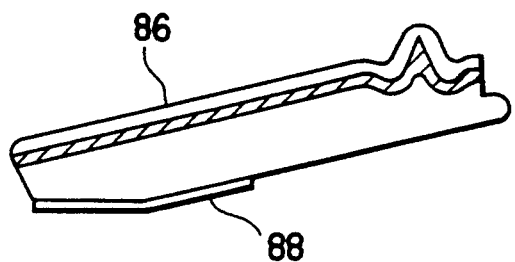
Figure 11J:
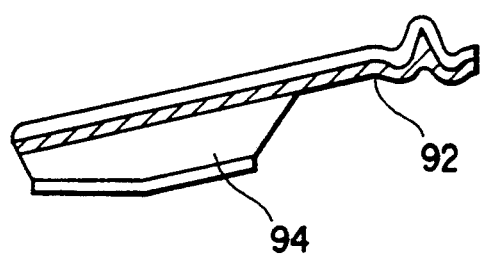
Figure 11K:
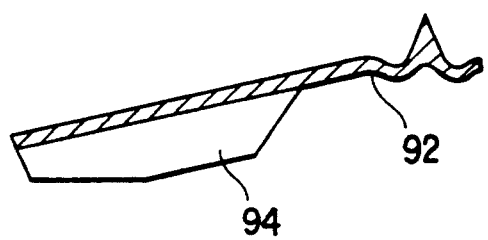
Figure 11L:
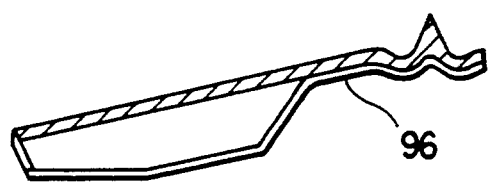
Figure 13:
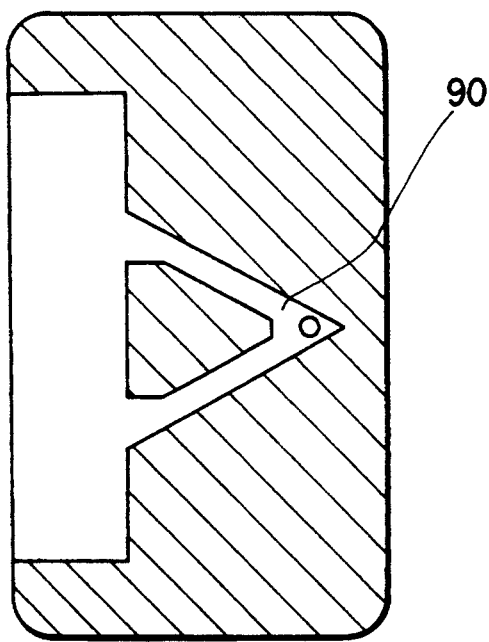
FIG. 13 shows the shape of the cantilever patterned in the step in FIG. 11I.

The silicon oxide layer 86 on the upper surface of the wafer is patterned into a cantilever shape 90 shown in FIG. 13, and the silicon oxide layer 88 on the lower surface of the wafer is also patterned into a predetermined shape (FIG. 11I). Portions indicated by hatched lines in FIG. 13 are portions to be removed by etching later. The resultant structure is anisotropically etched by an aqueous potassium hydroxide solution using the patterned silicon oxide films 86 and 88 as masks to form a cantilever 92 and a holding substrate 94 (FIG. 11J). Subsequently, the silicon oxide layers 86 and 88 are removed by hydrofluoric acid (FIG. 11K). Finally, a gold coating layer 96 is formed on the lower surface of the resultant structure to obtain the cantilever 60 of this embodiment (FIG. 11L).

Figure 14A:
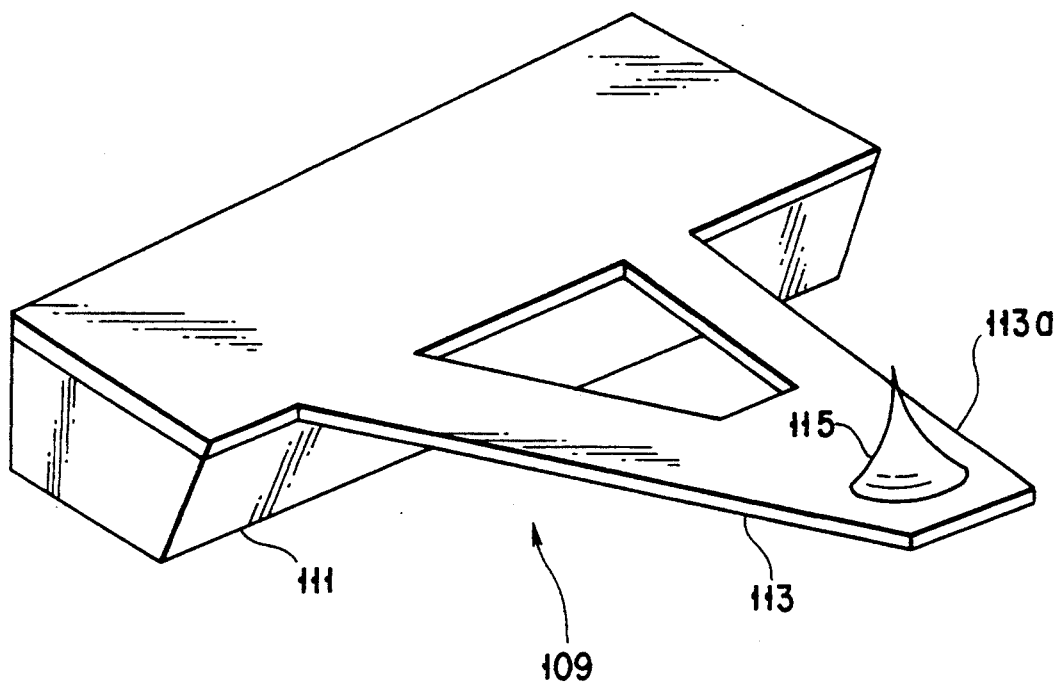
FIG. 14A is a perspective view showing a cantilever chip according to the third embodiment of the present invention.
Figure 14B:
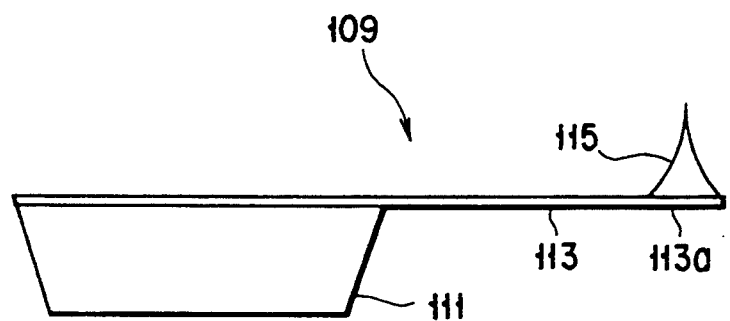
FIG. 14B is a cross-sectional view showing the cantilever chip in FIG. 14A.

A cantilever chip according to the third embodiment Of the present invention will be described below with reference to FIGS. 14A and 14B. A cantilever 109, as shown in FIGS. 14A and 14B, comprises a support portion 111, a cantilever 113 extending from an end face of the support portion 111, and a conical probe 115 having a sharp distal end extending on a free end portion 113a of the cantilever 113.

The conical probe 115 applied to this embodiment has a distal end having a radius of curvature smaller than that of a conventional conical probe and has an aspect ratio higher than that of the conventional conical probe because of the sharpening processing. Therefore, in AFM measurement, an ability of tracing (following) the surface shape of a sample (not shown) can be improved.

A method of manufacturing the cantilever chip 109 will be described below with reference to FIGS. 15A to 15J.

Figure 15A:
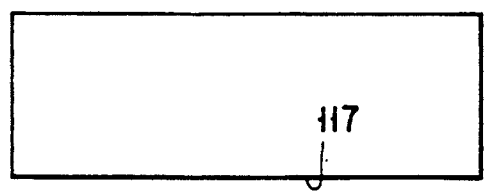
FIGS. 15A to 15J are views for explaining the steps in manufacturing the cantilever chip shown in FIGS. 14A and 14B.

An n-type starting wafer 117 having the (100) plane is prepared (FIG. 15A). After a silicon nitride film is deposited on the surface of the starting wafer 117 to have a thickness of 400 nm, the silicon nitride is patterned by photolithography using a photosensitive resist 19 to form a probe forming mask 121 having a diameter of 3 μm (FIG. 15B).

Figure 15F:
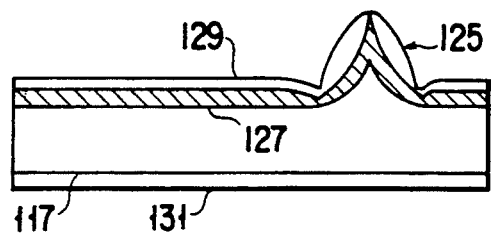
Figure 15B:
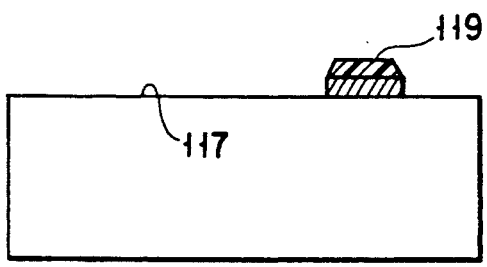
Figure 15G:
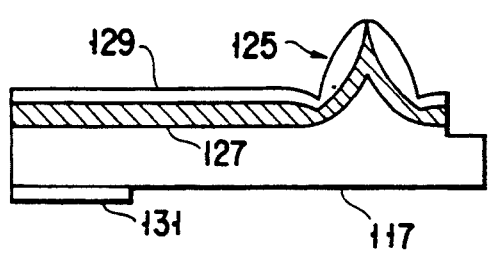
Figure 15C:
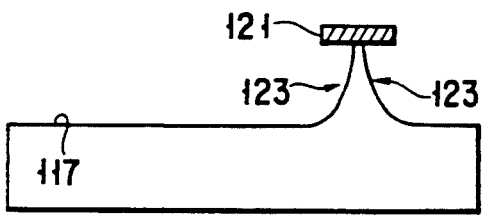

After the photosensitive resist 119 remaining on the mask 121 is removed, the wafer 117 is anisotropically dry-etched by reactive ion etching (RIE) using an $SF_6$ gas such that a portion (portion represented by reference numeral 123) of the wafer 117 under the mask 121 is hollowed out (FIG. 15C).

Figure 15H:
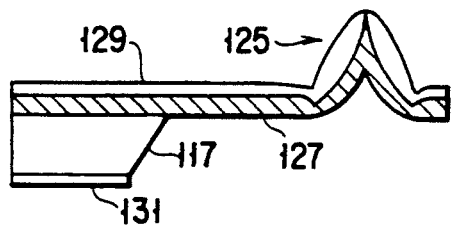
Figure 15D:
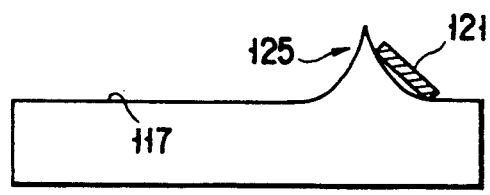
Figure 15I:
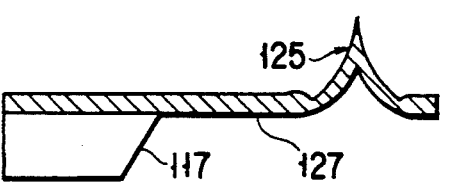
Figure 15E:
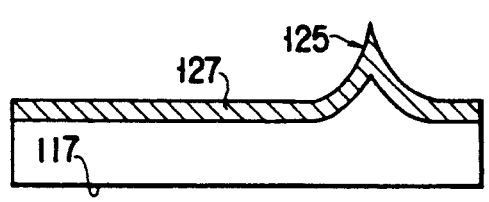

As shown in FIG. 15D, after the etching is stopped immediately before the mask 121 falls, the mask 121 is dissolved with hot phosphoric acid to be removed, a probe base portion 125 of the conical probe 115 (FIGS. 14A and 14B) of the cantilever chip 109 is formed.

After boron is doped by ion implantation at a concentration of $10^{20}$ atoms/cm$^3$ in the surface of the wafer 117 on which the probe base portion 125 is formed so as to form a p-type silicon layer 127 (FIG. 15E), the upper and lower surfaces of the wafer 117 are oxidized in a thermal diffusion furnace heated at about 950° C. to form silicon oxide layers 129 and 131 (FIG. 15F).

When the wafer 117 (FIG. 15G) patterned into the cantilever shape by etching the silicon oxide layers 129 and 131 is dipped in an aqueous potassium hydroxide solution to perform wet anisotropic etching of the wafer 117, the etching is stopped at the silicon layer 127 doped with boron (FIG. 15H).

Figure 15J:
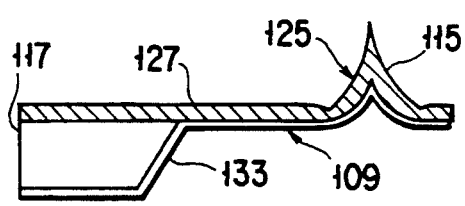

After the silicon oxide layers 129 and 131 remaining on the upper and lower surfaces are removed by hydrofluoric acid (FIG. 15I), gold 133 is coated on the lower surface of the resultant structure (FIG. 15J).

As a result, the cantilever chip 109 (FIGS. 14A and 14B) of this embodiment is completed.

Since the cantilever chip 109 of this embodiment manufactured as described above is oxidized in the thermal diffusion furnace, the conical probe 115 having a small radius of curvature and a high aspect ratio can be obtained. Note that the aspect ratio is a ratio of the height of the probe 115 to the radius of the bottom surface of the probe 115. A high aspect ratio means that the conical probe 115 is sharpened.

A cantilever chip according to the fourth embodiment of the present invention will be described below with reference to FIGS. 16A and 16B. In the description of this embodiment, the same reference numerals as in the third embodiment denote the same parts in the fourth embodiment, and a description thereof is omitted.

As shown in FIGS. 16A and 16B, a cantilever chip 109 comprises, as a characteristic feature, a conical probe 115 inclined at a predetermined angle (θ) with respect to a normal direction (N) of a cantilever 113.

A method of manufacturing the cantilever chip 109 having the above probe 115 will be described below with reference to FIGS. 17A to 17J.

Figure 17A:
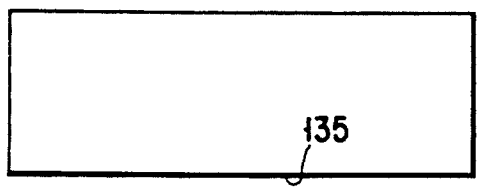
FIGS. 17A to 17J are views for explaining the steps in manufacturing the cantilever chip shown in FIGS. 14A and 14B.
Figure 17B:
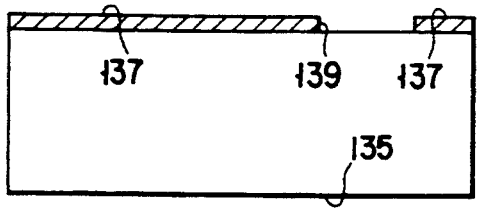
Figure 17C:
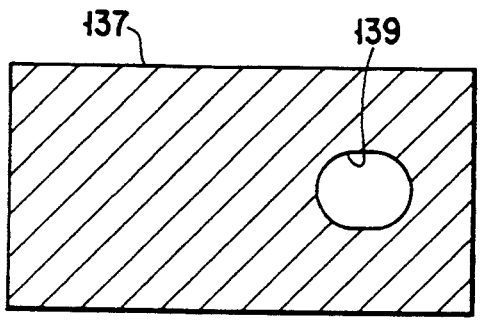

An n-type starting wafer 135 having the (100) plane is prepared (FIG. 17A). After a silicon nitride film 137 is deposited on the surface of the starting wafer 135 to have a thickness of 400 nm, the silicon nitride film 137 is patterned by photolithography using a photosensitive resist (not shown) to form an oval hole 139 having a diameter of 3 μm is formed in the silicon nitride film 137 (FIGS. 17B and 17C).

Figure 17D:
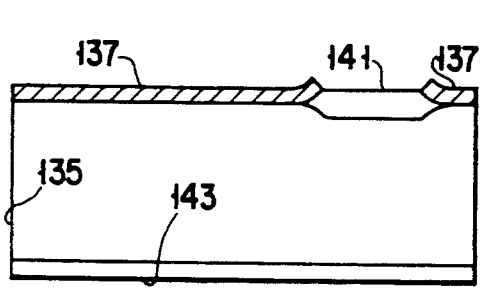

Thereafter, when the upper and lower surfaces of the wafer 135 are oxidized in a thermal diffusion furnace heated at about 950° C. to form silicon oxide layers 141 and 143, the silicon oxide layer 141 in the oval hole 139 is grown like a bird's beak by a LOCOS effect such that the end portion of the silicon nitride film 137 is lifted (FIG. 17D). The thickness of the silicon oxide layer 141 is about 500 nm at its central portion.

Figure 17E:
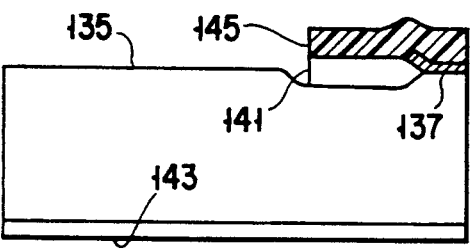

After the resultant structure is patterned by photolithography using a resist layer 145 coated on the upper surfaces of the silicon nitride film 137 and the silicon oxide layer 141, the exposed portion is etched. By this etching, the exposed portions of the silicon nitride film 137 and the silicon oxide layer 141 are removed, and the outer circumference of the silicon oxide layer 141 is formed to be almost circular (FIG. 17E).

Figure 17F:
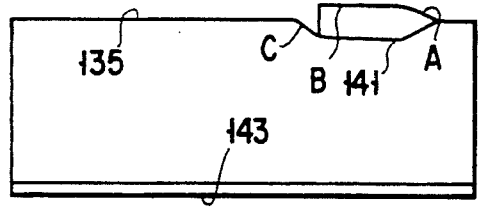
Figure 17G:
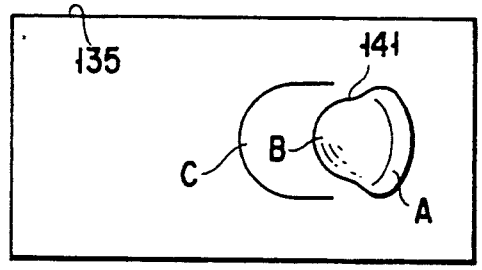

After the resist layer 145 is removed, when the silicon nitride film 137 remaining under the resist layer 145 is dissolved by hot phosphoric acid, only the silicon oxide layer 141 having the almost circular shape remains on the upper surface of the starting wafer 135 (FIGS. 17F and 17G). A thin portion A and a thick portion B are locally formed in the silicon oxide layer 141, and the silicon oxide layer 141 prospectively serves as a mask for forming a probe. Note that reference symbol C denotes a portion where the exposed starting wafer 135 is slightly etched.

Figure 17H:
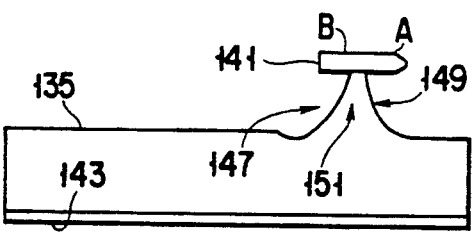
Figure 17I:
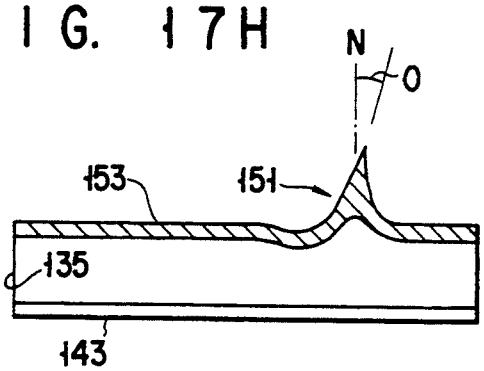

The resultant structure is dry-etched by RIE such that portions (portions represented by reference numerals 147 and 149) of the wafer 135 under the silicon oxide layer 141 are hollowed out (FIG. 17H). Since the thickness of the silicon oxide layer 141 serving as the mask for the above etching is not uniform, the etching rate of the portion 147 is different from that of the portion 149. Therefore, a probe base portion 151 formed by etching is inclined by a predetermined angle (8) with respect to the normal direction N (100) of the surface of the wafer 135 (FIG. 17I).

More specifically, a ratio of the etching rate of the silicon oxide layer 141 to the etching rate of the wafer 135 is about 50:1. As etching time passes, the wafer 135 is etched from the deep portion C, and the silicon oxide layer 141 is gradually decreased in thickness from the portion A having a small thickness. As a result, the wafer 135 remaining at the lower portions (the portions represented by reference numerals 147 and 149) of the silicon oxide layer 141, i.e., the probe base portion 151 has an asymmetric shape.

In the third embodiment described above, as shown in FIG. 15C, since the thickness of the probe forming mask 121 is uniform, the inclination of the probe base portion 151 of the fourth embodiment does not occur.

Figure 17J:
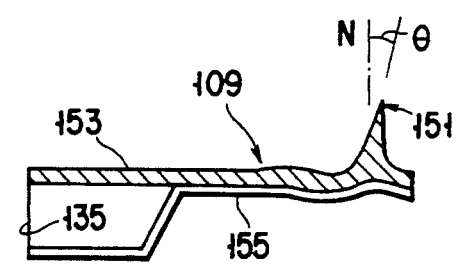

Thereafter, the same processes as those shown in FIGS. 15E to 15J of the third embodiment are performed. That is, after boron is doped by ion implantation in the surface of the wafer 135 on which the probe base portion 151 is formed so as to form a silicon layer 153 (FIG. 17I), the resultant structure is thermally oxidized in a thermal diffusion furnace and processed by an aqueous potassium hydroxide solution and hydrofluoric acid, and the lower surface of the cantilever chip 109 is coated with gold 155 (FIG. 17J).

As a result, the cantilever chip 109 of this embodiment is completed (FIGS. 16A and 16B).

Since the cantilever chip 109 formed as described above is thermally processed in the thermal diffusion furnace, the probe 115 having a small radius of curvature and a high aspect ratio can be obtained. In addition, since the conical probe 115 is formed to be inclined with respect to the normal of the surface of the cantilever 113, even when a step-like sample 157 shown in FIG. 18A is measured, the probe 115 can accurately scan the sample 157 along the left and right ascending and descending surfaces of the sample 157. As a result, as shown in FIG. 18B, a symmetrical AFM signal corresponding to the surface shape of the sample 157 is output, and the surface shape of the sample 157 can be expressed at high accuracy.

In the first embodiment, since wet anisotropic etching is used in the process of defining the shape of a probe, the vertex angle of the probe is determined by an angle at which the (111) planes cross each other, and an aspect ratio is naturally limited. In contrast to this, in the fourth embodiment, since the shape of a probe can be almost defined by plasma dry etching, when the etching conditions are changed, an aspect ratio can be set to be higher than that obtained by wet anisotropic etching.

Note that a modification of a mask used for forming the inclined probe 115 described in the fourth embodiment is shown in FIGS. 19A to 19C.

An important point in formation of the inclined probe is that a plasma dry etching mask having an asymmetric thickness distribution is formed.

For this reason, in this modification, a multilayered mask is used.

A first silicon oxide mask 161 consisting of silicon oxide is patterned (FIG. 19B) by photolithography on the surface of a starting wafer 159 (FIG. 19A), and a second resist mask 163 consisting of a resist agent is stacked on the silicon oxide mask 161 by photolithography (FIG. 19C).

The silicon oxide mask 161 and the resist mask 163 are formed to have different shapes, respectively.

Thereafter, when the processes shown in FIGS. 17F to 17J are performed to the wafer 159, as in the fourth embodiment, a cantilever having the inclined probe is manufactured.

The operation and effect of the cantilever manufactured as described above are the same as those of the cantilever of the fourth embodiment, and a description thereof is omitted.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A cantilever chip for a scanning probe microscope, comprising:
   a cantilever having a fixed end and a free end; and
   an inclined probe arranged at the free end of said cantilever and extending along an axis inclined with respect to a normal extending from a surface of said cantilever, a distal end portion of said inclined probe having a sectional shape in a plane perpendicular to the axis which is a symmetrical quadrangular pyramid shape when viewed from a longitudinal direction of said cantilever, said inclined probe having first and second pairs of surfaces converging on a point, said first pair of surfaces facing each other and being shaped in a form of quasi-triangles congruent with each other and each of which has three sides of different lengths, and said second pair of surfaces facing each other and being shaped in a form of quasi-triangles similar to each other and each of which has two equal length sides.

2. A cantilever chip according to claim 1, wherein said inclined probe has an inclined pyramid shape.

3. A cantilever chip according to claim 1, wherein said inclined probe is inclined in the longitudinal direction of said cantilever.

4. A cantilever chip for a scanning probe microscope, comprising:
   a cantilever having a fixed end and a free end; and
   an inclined probe arranged at the free end of said cantilever and extending along an axis inclined with respect to a normal extending from a surface of said cantilever, a distal end portion of said inclined probe having a sectional shape in a plane perpendicular to the axis which is a symmetrical quadrangular pyramid shape when viewed from a longitudinal direction of said cantilever, said inclined probe having first and second pairs of surfaces converging on a line, said first pair of surfaces facing each other and being shaped in a form of quasi-trapeziums congruent with each other and each of which has four sides of different lengths, and said second pair of surfaces facing each other and being shaped in a form of quasi-triangles similar to each other and each of which has two equal sides.

5. A cantilever chip according to claim 4, wherein said probe has a blade shape, and has a slanting ridge.

6. A cantilever chip according to claim 5, wherein:
said ridge has two ends and extends parallel to the longitudinal direction of the cantilever; and
said inclined axis extends through one of said ends of said ridge which is closer to the free end of said cantilever.

7. A cantilever chip according to claim 4, wherein said inclined probe is inclined in the longitudinal direction of said cantilever.

8. A cantilever chip for a scanning probe microscope, comprising:
a holding substrate having a major surface;
a cantilever having a fixed end and a free end, said cantilever having a first plane parallel to said major surface of said holding substrate, and a second plane provided at said free end and which extends from, and is inclined with respect to, said first plane; and
a probe arranged on said second inclined plane of said cantilever and extending along an axis which is normal to said second inclined plane so that said probe is inclined relative to said first plane and relative to said major surface of said holding substrate, a distal end portion of said probe having a sectional shape in a plane perpendicular to the axis which is a symmetrical cone shape when viewed from a longitudinal direction of said cantilever.

9. A cantilever chip according to claim 8, wherein said inclined probe is inclined in the longitudinal direction of said cantilever.

* * * * *